United States Patent [19]
Bowers

[11] Patent Number: 5,980,752
[45] Date of Patent: Nov. 9, 1999

[54] WATER PURIFICATION SYSTEM FOR HOT TUBS AND THE LIKE

[76] Inventor: Roy Bowers, P.O. Box 830, Verdi, Nev. 89439

[21] Appl. No.: 08/918,184

[22] Filed: Aug. 21, 1997

[51] Int. Cl.[6] .................................................. C02F 9/00
[52] U.S. Cl. ........................ 210/668; 210/681; 210/694; 210/282; 210/284
[58] Field of Search ..................................... 210/663, 668, 210/681, 694, 181, 259, 282, 283, 284, 290, 501, 502.1, 503

[56] References Cited

U.S. PATENT DOCUMENTS

| | | | |
|---|---|---|---|
| 4,663,613 | 5/1987 | Raleigh et al. | 210/181 |
| 4,749,481 | 6/1988 | Wheatley | 210/282 |
| 5,019,254 | 5/1991 | Abrevaya et al. | 210/282 |
| 5,149,437 | 9/1992 | Wilkinson et al. | 210/284 |
| 5,279,748 | 1/1994 | Hackett | 210/282 |
| 5,578,213 | 11/1996 | Miller et al. | 210/259 |

*Primary Examiner*—Ivars Cintins
*Attorney, Agent, or Firm*—Skinner, Sutton, Watson & Rounds; Adrienne Yeung; Charles Hartman

[57] ABSTRACT

Water purification is achieved by contacting the water with a container of charcoal, zeolite and a bimetallic alloy. In a preferred embodiment, the three components are segregated from each other and contained in a bag having three compartments.

5 Claims, 1 Drawing Sheet

WATER PURIFICATION SYSTEM FOR HOT TUBS AND THE LIKE

BACKGROUND OF THE INVENTION

1. Field of the Invention

This invention relates to methods of purifying water, particularly purifying the water used in hot tubs and the like, and most particularly to methods of purifying hot tubs not involving addition of substantial amounts of dissolved chemicals in the water.

2. State of the Art

Recreational users of hot tubs, spas, and whirl pool baths of various sorts, hereinafter generically referred to as hot tubs, enjoy and use them more than ever. At one time or another, most of the users have noticed the nearly universal problem affecting water quality that most hot tubs have: maintaining clear, sanitary and odor free water after frequent uses.

Many solutions have been tried to maintain the water quality. One common method is the brute force method of adding large amounts of chlorine to the water. This tends to give hot tubs a distinct chlorine odor and can, at times be strong enough to cause mild respiratory distress. Moreover, the amount of chlorine tends to become so concentrated, that, with time all of the water in the hot tub must be replaced.

Another solution tried is the on-site generation of ozone gas ($O_3$). Ozone is a toxic gas, more toxic than chlorine, and it must be generated on site, requiring expensive and troublesome equipment to generate. It is troublesome to regulate, and production of more than the required amount can cause mucus membrane and eye irritation in the users of the equipment, and in large enough quantities, over production can erode covers used to protect the hot tub between uses. Even so, rarely can the generation equipment meet the demands for enough ozone to maintain the water quality placed on the system by frequent use of several people.

Yet another type of purification used is the ionization method. In this approach to the problem an electric current is passed between two electrodes, usually silver and copper, immersed in he water. This method leaves a copper residua in the water, indeed that is one of the reasons the method works. But copper can cause stains on the plaster used for the inside of the hot tub.

Combinations of the ozone method and the ionization method have been tried and the results have been poor. The resulting system is very expensive, the treatment irritating to the users, and the treatment is not long lasting.

Whatever method is used to purify the hot tub, the water in an average hot tub must be changed every three months or so and the attempt at purification process must start anew.

The hot tub user needs a better method to assure that the water contacting his body is pure, clean, and pleasant to be in.

SUMMARY OF THE INVENTION

Water purification is achieved by contacting the water with a container of charcoal, zeolite and a bimetallic alloy. In a preferred embodiment, the three components are segregated from each other and contained in a bag having three compartments.

A composition for purifying the water of hot tubs comprising:

contacting the water in a hot tub with porous container having a charge of a granular composition, no less than 10 weight percent of a granulated composition of a substantially binary alloy containing copper as one of the alloying metals, and at least 10% of a zeolytic material.

A composition for purifying the water of hot tubs comprising:

contacting the water in a hot tub with porous container having a charge of a granular composition, no less than 10 weight percent of a granulated composition of a substantially binary alloy containing an alloy of between 20 and 80 weight percent copper and between 80 and 20 weight percent zinc and at least 10% of a zeolytic material selected form the group consisting of chabazite, mordenite, erionite, faujasite, clinoptilolite, and ZSM-5.

It is preferred to have the composition of this invention contain charcoal as a third component. Preferably at least ten percent of the composition by weight will be charcoal or other carbon source.

A water purification system comprising:

a porous bag having a plurality of pockets, at least one pocket containing an amount of charcoal;

at least one pocket containing an amount of a granulated composition of a substantially binary copper;

and at least on pocket containing a zeolytic material.

DETAILED DESCRIPTION OF THE PREFERRED EMBODIMENT

Figure 1:
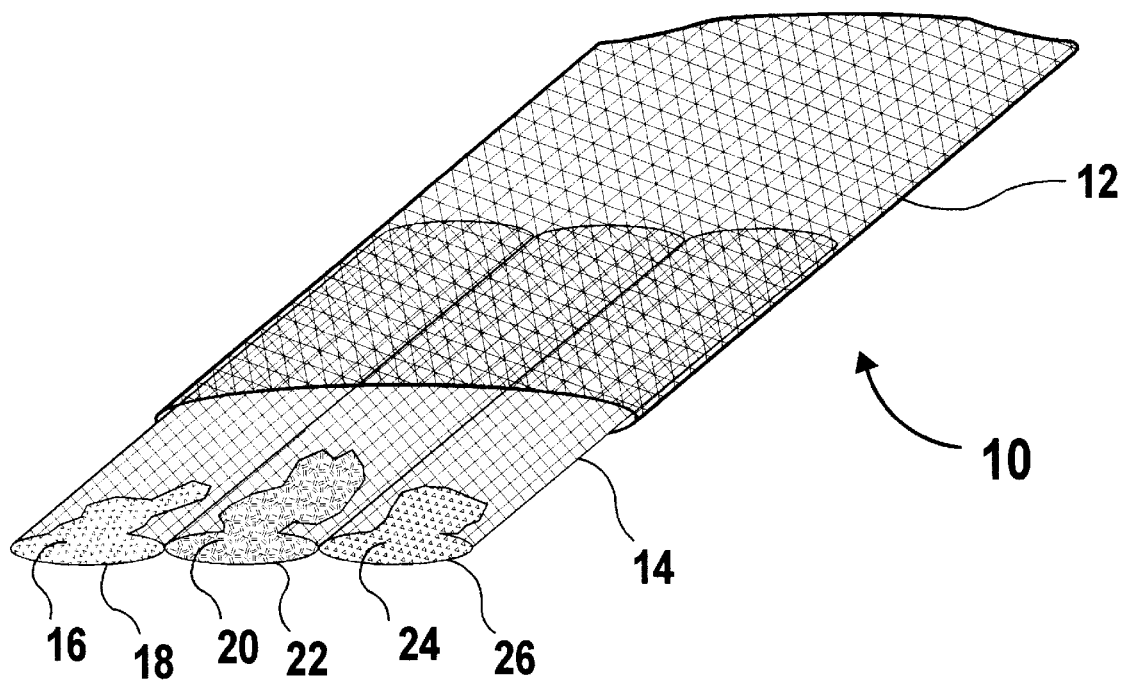
FIG. 1 shows a perspective cut-away view of the preferred embodiment of this invention.

Referring now to FIG. 1, in one embodiment of this invention, a water conditioning device of this invention 10, a loosely woven our bag 12 contains an inner micro porous bag 14. The inner micro porous bag has been divided into a first compartment 18, a second compartment 22, and a third compartment 26. The first compartment 18 contains an amount of activated charcoal 16, the second compartment 22 contains an amount of a binary copper alloy 20, and the third compartment 26 contains an amount of a molecular sieve. It is preferable that the material filling the three pockets is granulated coarsely enough that water can pass through the bed of material formed in each pocket.

The device of this embodiment is shown with the ends of the loosely woven outer bag 12, the ends of the first compartment 18, the ends of the second compartment 22, and the ends of the third compartment 26 open. It will be realized that in actual use the granulated material contained in the compartments would be secured by sewing the ends of the bags or similar fastening means.

Although it is preferred to have charcoal, in one embodiment the composition has only the alloy and the zeolite.

Figure 2:
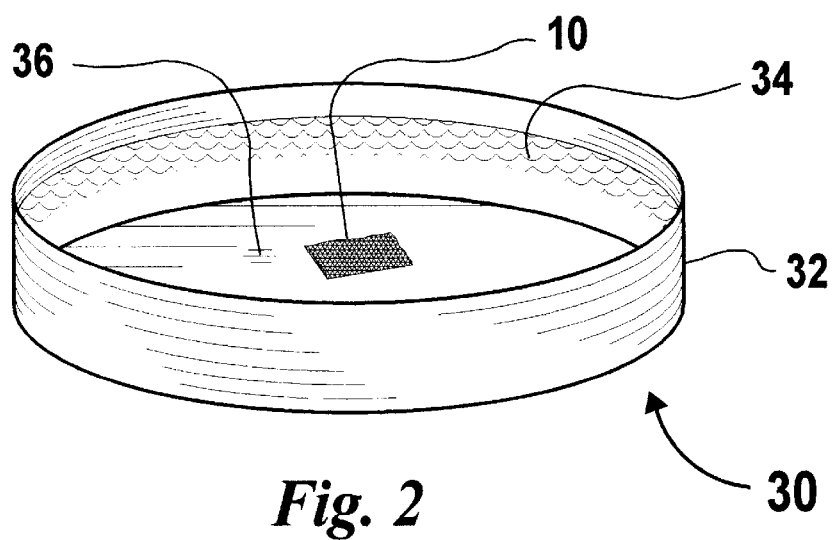
FIG. 2 shows a perspective view of the embodiment shown in FIG. 1 placed in a hot-tub.

Referring now to FIG. 2, the water conditioning device 10 of this embodiment of this invention is placed in the water of a hot tub 32. It rests on the bottom 36 of the pool of water under the water surface 34, where it remains during its effective life time, whether the hot tub pool is being used or not. The water may be pumped over the bag as when the hot tub is in active use, or it may passively interact with the contents of the bag. The material of the bag tends to clarify the water, and purify it how ever much the water is circulated.

In a second embodiment, the charcoal granules, the alloy granules and the zeolite are mixed togther in the inner bag which has no internal dividers. Other embodiments include passing the water through a canister mounted on the outside of the hot tub filled with the charcoal, alloy and zeolite.

The outer bag is made of a loosely woven or knitted material having at least the structural strength to stand up to the wear and tear expected in the environment of a hot tub. Synthetic materials such as knitted nylon or rayon, or natural fibers such as knitted cotton may be used.

The granulated catalytic activated carbon, such as that sold by Calgon Carbon Corporation, Pittsburgh, Pa., under the trade name Centaur granulated activated carbon, adsorbs organic components in the water in the hot tub. Examples of organic constituents of the water include, oils washed off the body, degradation products of cells, suntan lotion, and other objectionable fluids and dissolved solids. It also clarifies and decolorizes the water.

The bimetallic alloy can be any copper alloy, such as with tin, lead, and silver, but the preferred is an alloy of copper and zinc. The alloy interacts with the components of the water and participates in a variety of redox reactions with the components. It provides many benefits to the overall operation of the system. It removes free chlorine from the water by reducing it to chloride ion which is unobjectionable in solution, and which may bind the chloride to the metal alloy particles. It reacts with the oxygen levels and the soluble ferrous ions to precipitate ferric hydroxide and inhibit the growth and proliferation of iron metabolizing bacteria. The metals used can be copper and zinc, the most preferred, or copper and silver, or magnesium and copper, or similar dissimilar types of metals. KDF Fluid Treatment, Incorporated, Three Rivers, Mich., sells a particulary preferred granulated alloy under the name KDF 55.

The zeolytic material can be one selected from the group consisting of the naturally occurring zeolites, such as, chabazite, mordenite, erionite, faujasite, and clinoptilolite, and synthetic zeolites such as ZSM-5. One particularly preferred material is sold under the name of Clinolite. In the system as herein described it functions to remove ammonia from the water.

The three materials can be segregated, as shown in FIG. 1, or they can be mixed together, to form a bulk water purifying media. If they are added together to form one media for water purification, the granular components should be about the same size to avoid size segregation in the bag and allow easy flow-through of the water through the purifying media.

The charcoal or carbon is preferred, but not required for the operation of this invention. A two pocket device may be used as well.

The water need not be actively pumped over or through the media, the natural circulation of the water in the pool is enough to allow the action of the media to purify the water. It will of course be realized that the water must circulate, that is to say that it cannot held absolutely motionless. Hot tubs and similar water containing apparatus circulate water enough tor the operation of the invention during normal operation. However, it has been observed that if the water of a hot tub using this invention gets turbid with heavy use, the standing water in the tub will tend to clarify within several days without the water being forced to circulate.

The pH of the water used in the hot tub using this invention will be between about 5 to 9, preferably between about 6.5 to 8.5, and most preferably between about 7.2 to 7.8. The pH will be balanced by conventional means, by the addition of hydrochloric or muriatic acid (HCl) and sodium bicarbonate ($Na_2CO_3$). It is preferred that the water have between about 50 to 300 ppm, preferably between about 100 to 200, and most preferably between about 120 to 180 ppm calcium hardness.

It is preferred that the composition contains at least 25 weight percent of a granulated charcoal, at least 25 weight percent of a binary alloy, and at least 25 weight percent of a zeolite.

Although not required for the operation of this invention, it has been observed that a magnet mounted on the water line into the hot tub tends to promote the action of the operation of this invention. One such preferred magnet is sold by The magnetizer Group, Incorporated, under the trade name Magnetizer.

The alloy of metals tends to eliminate the any free molecular chorine in the water, although with the use of this invention this is less of a problem since chlorine need not be used to cleat the water.

With the use of the invention the water in hot tub needs not be emptied because there is no chlorine. If the calcium level gets up too high the water may be drained, but if the calcium level are watched the tub may never need draining in the ordinary course of usage.

While this invention has been described by reference to specific embodiments and examples, the invention will suggest other embodiments to those skilled in the art. The appended claims are intended to encompass all such embodiments.

I claim:

1. A method for purifying the water of hot tubs comprising:

contacting the water in a hot tub with porous container having a plurality of pockets, the first pocket containing a charge of at least 25 weight percent of a granulated composition of a substantially binary alloy containing copper as one of the alloying metals, a second pocket containing at least 25 weight percent of a zeolytic material, and a third pocket containing a charge of at least 25% granular charcoal particles.

2. The method of claim 1 wherein the binary alloy of copper is an alloy of between 20 and 80 weight percent copper and between 80 and 20 weight percent zinc.

3. The method of claim 1 wherein the binary alloy of copper is an alloy of between 40 and 60 weight percent copper and between 60 and 40 weight percent zinc.

4. The method of claim 1 wherein the zeolytic material is selected from the group consisting of chabazite, mordenite, erionite, faujasite, clinoptilolite, and ZSM-5.

5. An apparatus for purifying the water of hot tubs comprising:

a porous container having three pockets, the first containing a charge of a granular composition no less than 25 weight percent of a substantially binary alloy containing an alloy of between 20 and 80 weight percent copper and between 80 and 20 weight percent zinc the second pocket containing at least 25 weight percent of a zeolytic material selected from the group consisting of chabazite, mordenite, erionite, faujasite, clinoptilolite, and ZSM-5, and a third pocket containing at least 25 weight percent of granulated charcoal.

\* \* \* \* \*